Oct. 19, 1965 A. M. LORD 3,213,284
HELIO-TROPIC ORIENTATION SYSTEM WITH FRICTION-FREE
MECHANICAL LINKAGE
Filed Nov. 2, 1961 3 Sheets-Sheet 1
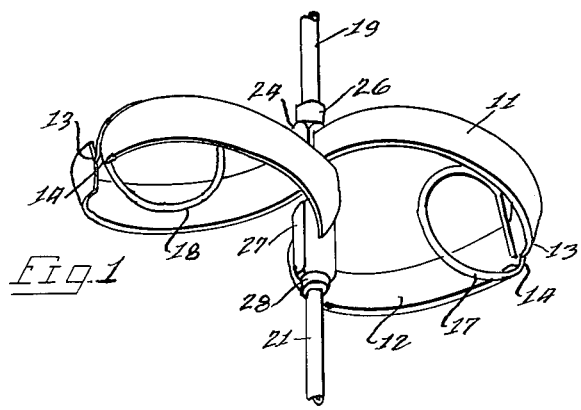
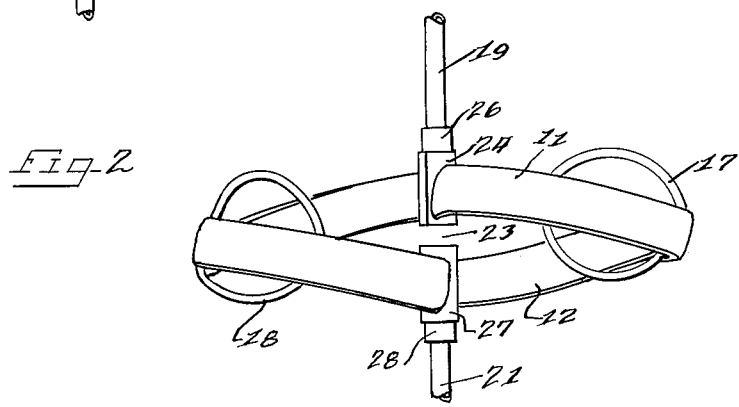
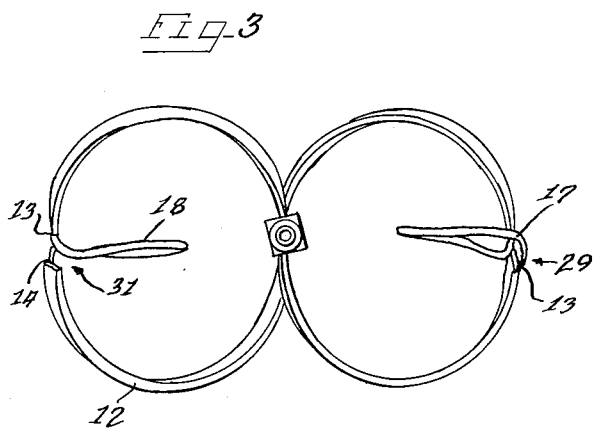
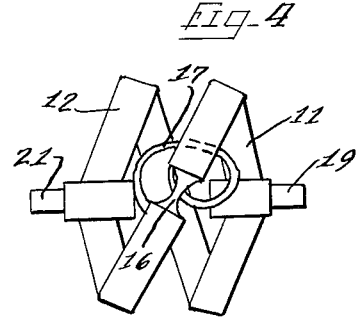
INVENTOR.
Albert M. Lord
BY
ATTORNEYS

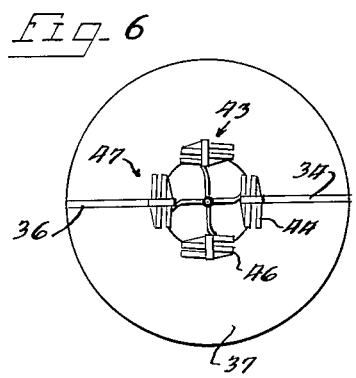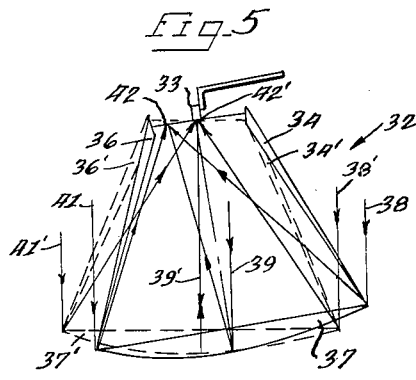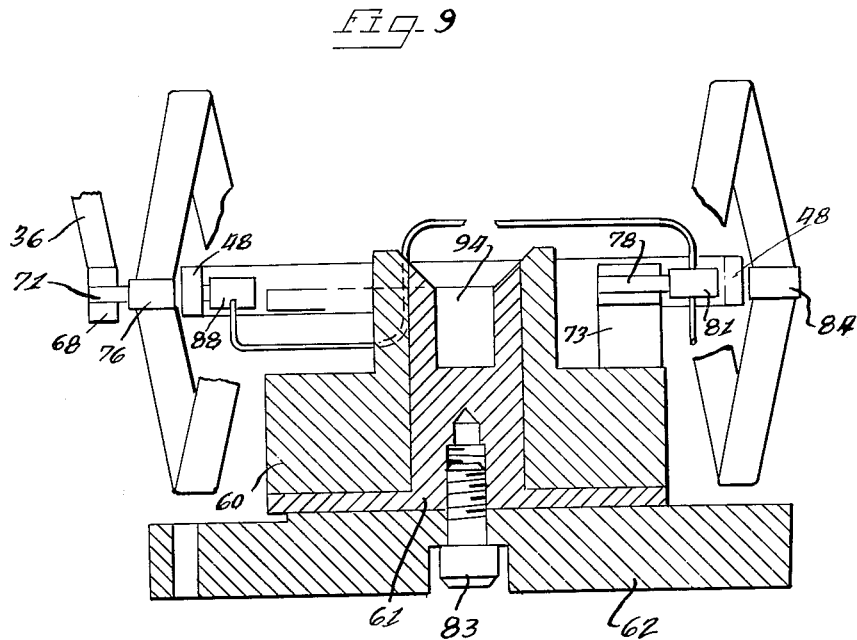

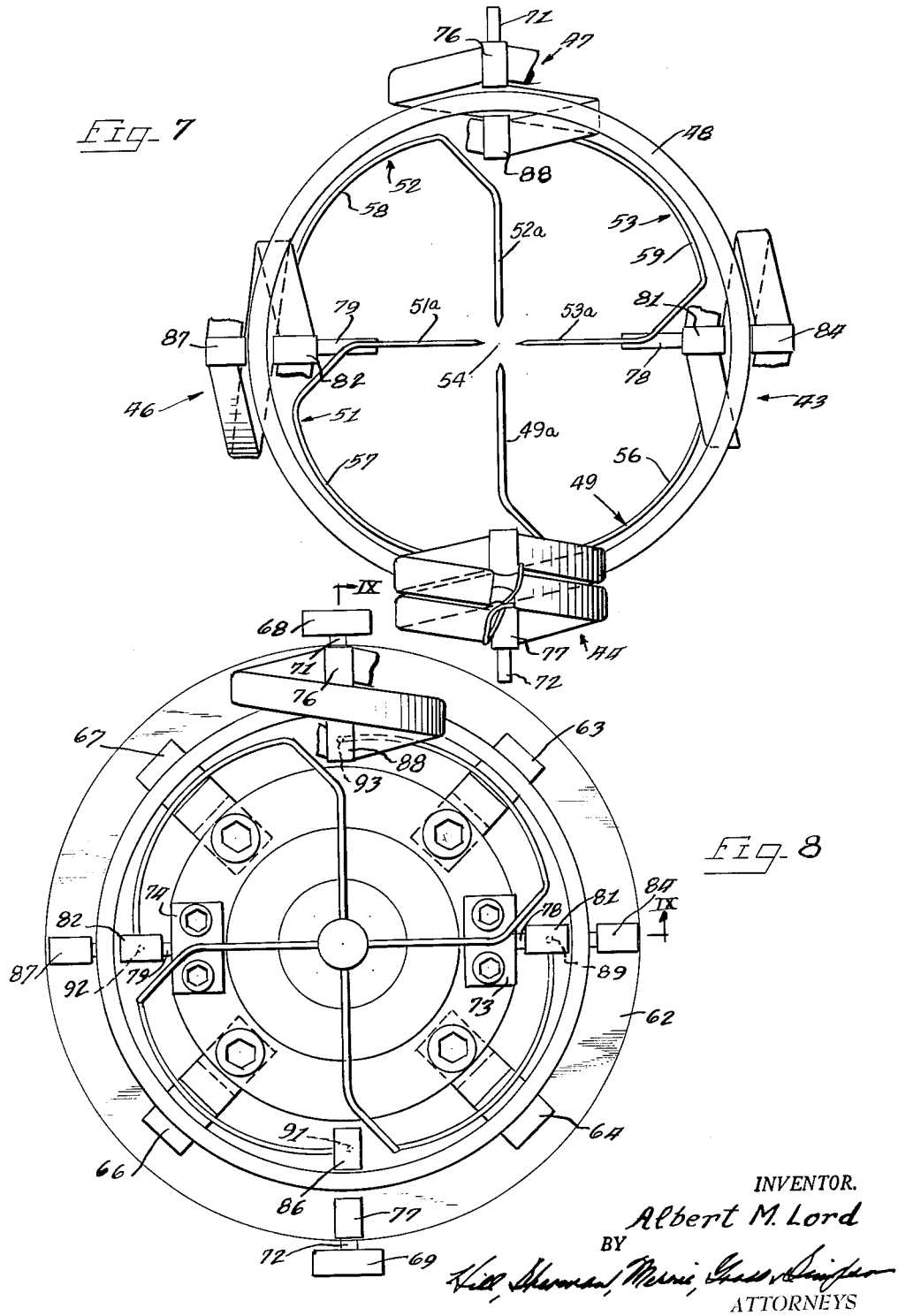

United States Patent Office 3,213,284
Patented Oct. 19, 1965

3,213,284
HELIO-TROPIC ORIENTATION SYSTEM WITH
FRICTION-FREE MECHANICAL LINKAGE
Albert M. Lord, Olmsted Falls, Ohio, assignor to
TRW Inc., a corporation of Ohio
Filed Nov. 2, 1961, Ser. No. 149,733
6 Claims. (Cl. 250—215)

The present invention relates to a linkage incorporating condition sensitive means which will accomplish rotational motion without rolling or sliding friction, and more particularly to a means and method to produce rotational movement through a function-free linkage having as an integral part thereof interconnected reversely turned Bourdon tubes.

In space vehicle guide mechanisms indicating instruments, transducers and controls are operated by pressure or temperature sensing means which through a mechanical friction linkage produces the desired movement to record or make a corresponding corrective response to the space vehicle. One of the problems arising with such friction linkages is the lubrication of a torque transmitting system. That problem is very difficult in space systems or in high temperature environments. A further problem is the rubbing of two friction contacting surfaces together producing baring of the metal which in turn could cause severe pressure bonding at low atmospheric pressures and thereby the coefficients of friction will be increased so as to prevent the correct operation of the torque transmitting system.

By the elimination of the mechanical linkage from the means producing the torque to a rod and the rod, the elimination of lubrication and the elimination of the friction of the two metals rubbing one another, the cause for the equipment to be faulty after a long period of time is virtually eliminated.

It is an object of the invention to provide a means that will produce rotational motion without the use of a mechanical linkage having rolling or sliding friction.

It is another object of the invention to have a means that will rotate a rod through a friction-free mechanical linkage.

It is another object of the invention to have a Bourdon tube producing a rotational movement in a rod in accordance with the change in pressure or temperature by a mechanical friction-free linkage.

Still another object of the invention is to have two Bourdon tubes in reverse S-shape and S-shape connected to one another to form an 8-shaped Bourdon tube which in accord to the variance in pressure or temperature produces a rotational movement to a shaft connected to the tubes by a mechanical friction-free linkage.

It is still another object of the invention to have a heliotropic orientation mechanism having connected thereon the pressure or temperature indicating means which will orientate the heliotropic mechanism upon the variation of the temperature by the use of mechanical friction-free linkages on the pressure or temperature sensing means.

On the drawings:

FIGURE 1 is a bottom perspective view of a Bourdon tube having a mechanical friction-like linkage;

FIGURE 2 shows a side view of FIGURE 1;

FIGURE 3 shows a top view of FIGURE 1;

FIGURE 4 shows a side view of FIGURE 2;

FIGURE 5 shows a top view of the Bourdon tube having a mechanical friction-free linkage connected to a heliotropic solar concentrator mount;

FIGURE 6 shows the control mount of FIGURE 3 mounted onto a solar concentrator;

FIGURE 7 shows a side view of a solar concentrator being orientated;

FIGURE 8 shows a top view of solar concentrator shown in FIGURE 7; and

FIGURE 9 shows the sectional view of the solar concentrator taken along the lines IX—IX of FIGURE 8.

As shown on the drawings:

The invention advantageously exploits the utilization of condition sensitive means such as a Bourdon tube utilized to sense increases and decreases in a controlling variable such as pressure or temperature. When an increase in pressure occurs or a decrease in pressure occurs in the Bourdon tube, for example, the tube expands or contracts so as to produce a rotational movement in a rod that is fixedly attached thereto. The rod may be attached to an indicator means, transducer means, orientation means or any other means that may be operated by a torque transmitting system. The Bourdon tube by its expansion and contraction affords rotation to the shaft or rod without the use of a linkage that has rolling or sliding friction, when the Bourdon tube expands or contracts the rod is rotated therewith. Accordingly, it will be appreciated that the principles of the invention are of general applicability but will be described specifically in connection with an exemplary embodiment of the invention in a Bourdon tube-type control means associated with a solar concentrator of the type having a heliotropic orientation mechanism.

The temperature sensitive Bourdon tube is thus used to orientate the concentrator to a proper alignment to concentrate the solar energy upon a thermionic convertor. The Bourdon tube with the temperature sensing mechanism is mounted upon the thermionic convertor to sense the misalignment of the convertor by the concentrated solar energy contacting its surface and thereby correctly realigning or reorientating the thermionic convertor to absorb all the potential solar energy.

Referring to FIGURES 1 to 4 there is shown an upper S-shaped Bourdon tube 11 and a lower reversed S Bourdon tube 12 which are connected at their tail ends 13 and 14 to each other by a connector 16. The Bourdon tubes at their two tail ends are joined by tubes 17 and 18 that contain a suitable vaporizable liquid.

The Bourdon tubes are so joined at their tail ends as to present an 8-shaped Bourdon tube with two substantially circular cross sections, as is shown by FIGURE 3. Looking down vertically in the axial direction of rods 19 and 21 shown by FIGURE 3, the tubes present a figure eight configuration. The vertical planes of the Bourdon tubes intersect one another at 22 but do not contact each other at said intersection as is shown by a space 23 in FIGURE 2.

Connected to the Bourdon tube 11 is the mechanical linkage 24 which is fixedly secured to the Bourdon tube and allows the Bourdon tube to pass therethrough. On the linkage 24 is the integral smaller head 26 which secures the rod 19 to the linkage 24. The rod 19 may also be fixedly secured to the linkage 24 without the necessity of the head 26. However, the head 26 allows for the long threading of the rod 19 and a more firm and fixed fitting on the linkage 24.

Upon the lower Bourdon tube 12 is connected the linkage 27 fixedly secured to the tube 12 and allowing it to pass therethrough. Upon the linkage 27 is mounted the rod 21 through the linkage 27 and an extension head 28. The extension head provides for a firmer support from the rod 21 to the linkage 27. The rods 19 and 21 are secured into the extension heads 26 and 28 and the linkages 24 and 27 by a threaded connection or the rods 19 and 21 are an integral part of the linkages 24 and 27 and extensions 26 and 28, so that all three parts are continuous. The tubes 17 and 18, connected to the Bourdon tubes at leg ends 29 and 31, contain a vaporizable fluid. When the pressure increases or decreases the vapor pressure of the fluid tends to contract the leg ends 29 and 31 closer to each other or expand them further apart. Due to the twisted formation of the tubes 11 and 12 and the fixed linkage on the tubes 11 and 12 by the respective linkages 24 and 27 the expansion and contraction causes the rods 19 and 21 to rotate. In the exemplary form of the invention illustrated, a pressure of 500 p.s.i. exerted upon the Bourdon tube arrangement has produced a rotation of 9° in the rods. Thus, the rotation of the rods 19 and 21 is accomplished without any frictional movement of parts between the Bourdon tube unit and the rods 19 and 21. The necessity for lubricants, the ability to withstand long use, and the detrimental conditions met in the operation of space vehicles by the use of frictional rolling or sliding linkages, is completely avoided. Accordingly, the Bourdon tube by this arrangement is an effective friction-free torque transmitting device.

The tubes 17 and 18 can be utilized to detect a change in temperature since the vaporizable material will increase its vapor pressure as a function of temperature changes and the respective Bourdon tubes 11 and 12 will thereby cause the rotation of the rods 19 and 21 which are axially aligned. The rods 19 and 21 are connected to indicator control means which are actuated by the rotation of the rods.

The friction-free torque transmitting system may be effectively utilized in the orientation of a solar concentrator, which is shown generally at 32 in FIGURES 5 to 9. A solar convertor is shown at 33 and may be a cesium thermionic convertor. The solar concentrator 32 has side supports 34 and 36 and a paraboloidal reflecting base 37. When the concentrator 32 is not in alignment, the solar energy sun rays 38, 39 and 41 will be reflected upwards from the paraboloidal reflecting base 37 in such a manner as to concentrate the solar energy sun rays away from the convertor 33, as is shown in FIGURE 5, so as to concentrate at a focal point 42. Upon the correct alignment, as shown by the dotted lines in FIGURE 5, the paraboloidal reflecting base 37' of the concentrator zeros the solar energy sun rays 38', 39' and 41' in upon the convertor 33 at a concentrated focal point 42'.

The cesium solar convertor in order to operate effectively requires operating temperature of 2000 to 2400° K. and the alignment accuracies must be in the order of 0.1 of a degree to reach this operating temperature. The use of the friction-free torque transmitter enables the convertor to be orientated with a high degree of accuracy. The Bourdon tube friction-free torque transmitting devices 43, 44, 46 and 47 are connected diametrically opposite one another. The Bourdon tubes are connected to one another by a Bourdon tube circular support 48 as is shown in FIGURE 7. There are shown in FIGURE 7 tubular members 49, 51, 52 and 53 respectively connected to the Bourdon tube torque transmitting members 43, 44, 46 and 47. The tubular members contain vaporizable liquid and extend radially inwardly from the circular support member 48 until their terminals form an aperture 54 that is over the center of the cesium convertor. The tubes 49, 51, 52 and 53 pass from the Bourdon tube from which it is connected through respective arcs 56, 57, 58 and 59 of approximately 90° parallel to support 48 and then radially inwardly respectively at radial legs 49a, 51a, 52a and 53a that are on radial axes with the adjacent Bourdon torque transmitter.

The purpose of having the tube extending circumferentially away from the Bourdon friction-free torque transmitter to which it is connected and inwardly from the Bourdon friction-free torque transmitter adjacent thereto, is that the tube may be used to correctly orientate the solar concentrator. For example, if the concentrator was aligned so that the focal point of the solar energy sun rays shone on the radial portion 64 of the tube 53, the Bourdon torque transmitter 47 would rotate the convertor to counterclockwise to align the concentrated solar energy focal point with the convertor 33. However, if the leg portion 53a had extended directly radially from the torque transmitter 47 and the tube 49 had extended directly from the torque transmitter 43 we would now have leg 49a where 53a is shown on the drawing in FIGURE 7. Then when the sun solar energy rays contacted the substituted tube 49a this would cause the torque transmitter 43 to rotate and the rotation would not correct the misorientation of the solar energy concentrated focal point for it would be orientating towards the transmitter 44 (a clockwise rotation) instead of towards the transmitter 43 which is needed for the correction of the solar energy concentrated focal point.

As is seen in FIGURES 8 and 9 the thermionic solar convertor 61 is connected to the convertor support 62 which is connected to a convertor shield 60 by the brackets 63, 64, 66 and 67. The transmitter support 48 is secured to the paraboloidal concentrator reflector 37 by the support arms 34 and 36 and a bearing mounting 68 and 69 on each support arm. Journaled in the bearings 68 and 69 are the rods 71 and 72 that are part of the respective friction-free linkages 76 and 77 on the torque transmitters 47 and 44. The torque transmitters 43 and 46 are journaled in bearings 73 and 74 by their respective rods 78 and 79 that are part of the friction-free linkages 81 and 82 on the torque transmitters 43 and 46. The bearings 73 and 74 are mounted on the convertor shield 60. The cesium convertor 61 is connected to the convertor support 62 by a screw 83.

The friction-free torque transmitters 43, 44, 46 and 47 are connected to the transmitter support 48 by the linkages 84, 86, 87 and 88 respectively. The respective sensing tubes 49, 51, 52 and 53 communicate with the Bourdon torque transmitters through orifices 89, 91, 92 and 93 in the respective linkages 81, 86, 82 and 88. The convertor support 62 is pivotally gimbaled with respect to the transmitter support so as to produce a pivotal action of the concentrator while the convertor remains substantially stationary so that the focal point of the reflected sun rays will be at a center 94 of the cesium convertor 61.

Referring to FIGURES 5 and 7, the space vehicle when in operation comes in contact with sun rays which are reflected upon the reflector concentrator 37. The concentrator is parabolic in configuration so that the rays when striking the surface of the reflector 37 are reflected upwards to make a concentrated solar energy flux 42 and as shown in FIGURE 5. When the concentrator is misorientated so that the concentrated solar energy flux does not fall on the converter 33 but rather falls on one of the radial legs of the tubular members 49, 51, 52 and 53. The heat causes the fluid in the tubular member to vaporize and the increase in pressure exerted upon the Bourdon tube causes the rotation of the rod that is connected to the Bourdon tube which in turn is connected to the solar concentrator, thereby causing a correctional orientation. For example, if there is a misorientation of the concentrator so the rays are reflected at a position 42 on the tubular leg 64, the tubular leg 64 causes the torque transmitter 47 to rotate the thermionic solar concentrator in a counterclockwise direction thereby correctly orientating the solar concentrator to again concentrate the sun rays upon the thermionic convertor at a focal point 42'.

Although the invention has been described using four friction-free torque transmitters it is understood that more than four may be used depending on the type of alignment that may be used. As is shown, only alignment for a solar energy focal point varying at 90° intervals is effective, however, by utilizing six torque transmitters 60° intervals is effective; eight friction-free torque transmitters 45°; etc.

Thus the present invention shows a friction-free torque transmitting apparatus whereby the detrimental aspects of rolling and sliding friction to produce rotational movement is prevented.

Although various minor modifications of the present invention may become readily apparent to those skilled in the art, it should be understood that I wish to embody within the scope of the patent warranted hereon all such embodiments as reasonably and properly come within the scope of my contribution to the art.

I claim as my invention:

1. A solar energy concentrator comprising:
a paraboloidal concentrator reflecting sun rays to concentrate at a focal point a predetermined distance away from the concentrator,
a solar energy converter for converting solar energy into usable energy and mounted to be impinged by the concentrated rays at said focal point when in alignment therewith,
means pivotally mounting said concentrator to said converter and enabling adjustment for alignment of said focal point,
a plurality of Bourdon tubes and friction-free mechanical linkages connecting the Bourdon tubes operatively to the converter and the concentrator,
said Bourdon tubes having respective fluid filled sensing tubes communicating at one end with their Bourdon tubes and having opposite terminals defining an aperture aligned with said converter adjacent to said focal point and opposite said concentrator,
and said sensing tubes being respectively impinged by the concentrated rays when the focal point is misaligned relative to the converter and through the respective communications with the Bourdon tubes causing the respective Bourdon tubes to act responsive to such impingement to activate the associated friction-free linkages to pivot the concentrator and thereby effect focal point alignment with the converter.

2. A pressure sensitive friction-free torque transmitting device comprising a Bourdon tube unit having an upper and lower Bourdon tube, said upper and lower Bourdon tubes having reverse S and S configurations respectively, the upper and lower Bourdon tubes being connected at their tail ends to form a Bourdon tube of a figure eight configuration, an upper rod attached by a friction-free mechanical linkage to the upper Bourdon tube, a lower rod attached by a friction-free mechanical linkage to the lower Bourdon tube, the said upper and lower rods being in axial alignment and independently relatively rotatable on their common axis so that upon a change in pressure conditions at least one of the rods will rotate relative to the other rod due to an expansion or contraction of the Bourdon tube unit.

3. A rotating torque transmitting apparatus comprising first and second axially spaced rod means, a mechanical friction-free linkage interconnecting said rod means, said friction-free linkage being composed of a figure eight pressure and temperature sensing unit operatively attached to and driving said rod means in relative rotation in response to variation in pressure.

4. A rotating apparatus comprising a first and second rod means, a Bourdon tube unit made of an upper reverse S Bourdon tube and a lower S Bourdon tube connected at their tail ends, said upper and lower Bourdon tubes being interconnected by a tubular member containing a vaporizable liquid, said first rod means being connected to the upper Bourdon tube and said second rod means being connected to the lower Bourdon tube in spaced axial alignment with said first rod means, and said rods being attached in a mechanical friction-free linkage to the Bourdon tubes so that when the temperature and pressure sensitive Bourdon tube senses a variation in pressure and temperature the first and second rods will be driven in relative rotation.

5. A torque transmitting apparatus comprising a Bourdon tube twisted in a continuous S configuration, a rod attached by a friction-free mechanical linkage to the Bourdon tube and extending substantially perpendicularly from the axial center thereof, means opposing the opposite ends of the tube, said rod being rotated by the tube when the Bourdon tube senses a change in pressure.

6. A friction-free torque transmitting apparatus comprising a pressure and temperature sensitive figure eight sensing means having central axially spaced intersecting portions, first and second rod means extending in opposite directions from and attached by friction-free mechanical linkages to the respective central intersecting portions whereby the first and second rod means will be rotated by the sensing means in response to variations in pressure sensed by said figure eight sensing means.

References Cited by the Examiner
UNITED STATES PATENTS

| | | | |
|---|---|---|---|
| 2,155,402 | 4/39 | Clark | 250—203 |
| 2,670,989 | 3/54 | Ramsay | 73—368.6 |
| 2,850,870 | 9/58 | Martin | 60—23 |
| 2,937,527 | 5/60 | Mason et al. | 73—368.6 |
| 2,967,249 | 1/61 | Quirk | 250—215 |
| 2,993,125 | 7/61 | Geer et al. | 250—215 |
| 2,999,943 | 9/61 | Geer | 250—215 |
| 3,013,233 | 12/61 | Bourns | 73—412 |
| 3,070,699 | 12/62 | Lehmann | 250—203 |
| 3,095,745 | 7/63 | Kirwan | 73—412 |
| 3,152,260 | 10/64 | Cummings | 60—26 X |

RALPH G. NILSON, *Primary Examiner.*